June 21, 1955

D. KOETHKE 2,711,351

TRACKS FOR TRACTOR VEHICLES

Filed Nov. 26, 1952

Inventor
DEAN KOETHKE
By Lamphere + Van Valkenburgh
Attorneys

June 21, 1955  D. KOETHKE  2,711,351
TRACKS FOR TRACTOR VEHICLES
Filed Nov. 26, 1952  2 Sheets-Sheet 2
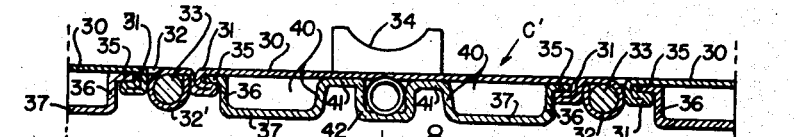
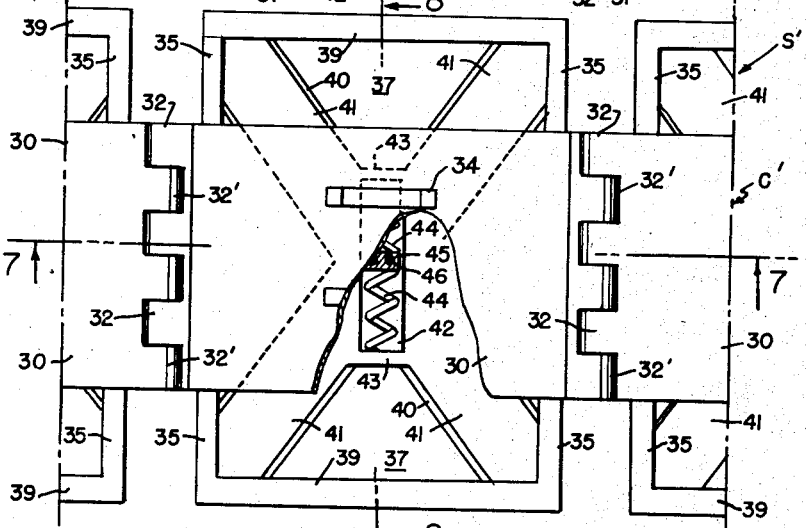
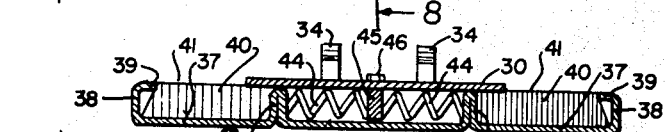
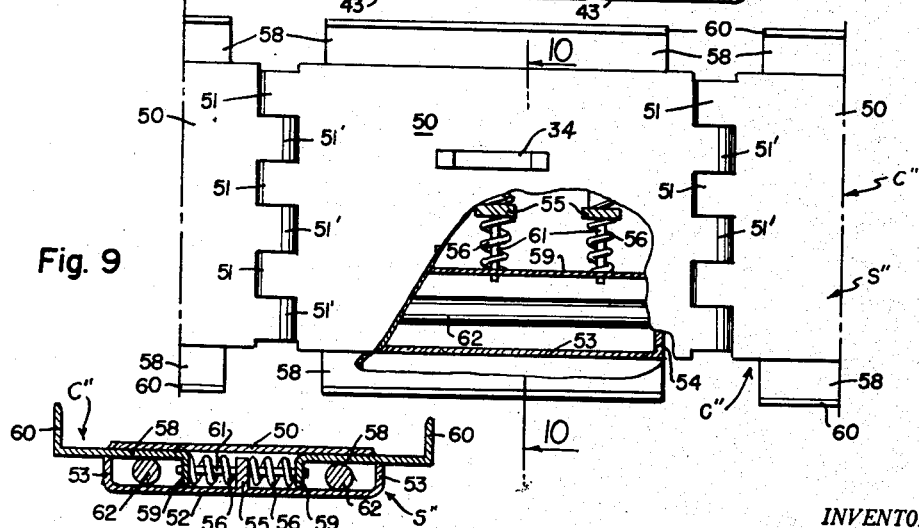
INVENTOR.
DEAN KOETHKE
BY
*[signature]*
ATTORNEYS United States Patent Office 2,711,351
Patented June 21, 1955

2,711,351
TRACKS FOR TRACTOR VEHICLES
Dean Koethke, Wallace, Idaho
Application November 26, 1952, Serial No. 322,661
17 Claims. (Cl. 305—10)

This invention relates to tracks for tractor vehicles and the like, and more particularly to continuous tracks used on vehicles such as so-called "caterpillar" tractors, so-called "half-track" vehicles which have a set of wheels at the front and a set of tracks at the rear, and other vehicles similarly using a continuous track.

Many present continuous track vehicles have a continuous track at each side of the vehicle, and each track may comprise a series of cleats which are pivoted together in succession, as by laterally extending pins which provide pivots for the cleats and also engage a drive sprocket at one end of the track. Each track is moved around a path extending longitudinally of the vehicle and generally a flattened oval in form, i. e. having a horizontal portion at the top and also at the bottom, successive cleats being placed on the ground at the front and remaining on the ground along the lower horizontal portion of the path. The vehicle is also equipped with rollers which guide the track around its path and other rollers which support the vehicle by rolling along the cleats when the latter are on the ground.

Vehicles such as half-tracks and the like, and other vehicles similarly having continuous tracks, are not only driven across rough ground, but also are often used on roads, highways, and other less irregular surfaces. Some of these vehicles are adapted to be driven at comparatively fast rates, and for turning around curves, or turning corners, as on streets, roads or highways, the radius of curvature is limited by the track. In the case of a vehicle supported completely by the tracks, curves and turns are negotiated by stopping or slowing the track on one side while speeding up or maintaining the speed of the track on the opposite side. However, at higher speeds, the vehicle must be slowed considerably to negotiate a sharp turn, since the vehicle will follow the path determined by the track, and successive cleats can be laid on the ground around a curve only as the vehicle itself turns.

Among the objects of the present invention are to provide a novel track for a continuous track vehicle and the like; to provide such a track which permits sharper turns and also permits turns to be taken at higher speeds; to provide such a track which does not interfere with the normal forward movement of the vehicle; to provide improvements in such tracks which can be incorporated in continuous track vehicles of present construction without undue difficulty; to provide such improvements which may exist in any one of several different forms; to provide such improvements which are sufficiently simple and rugged in construction that reliability in operation will be assured; and to provide such improvements which are relatively readily manufactured and easily installed.

Additional objects and the novel features of this invention will become apparent from the following description, taken in connection with the accompanying drawings, in which:

Fig. 6 is a top plan view of a portion of a continuous track, forming an additional embodiment of this invention, partly broken away to show the interior construction more clearly;

Fig. 7 is a vertical longitudinal section, taken along line 7—7 of Fig. 6;

Fig. 8 is a vertical transverse section, taken along line 8—8 of Fig. 6;

Fig. 9 is a top plan view of a portion of a continuous track forming a further embodiment of this invention; and Fig. 10 is a vertical transverse section, taken along line 10—10 of Fig. 9.

Figure 1:
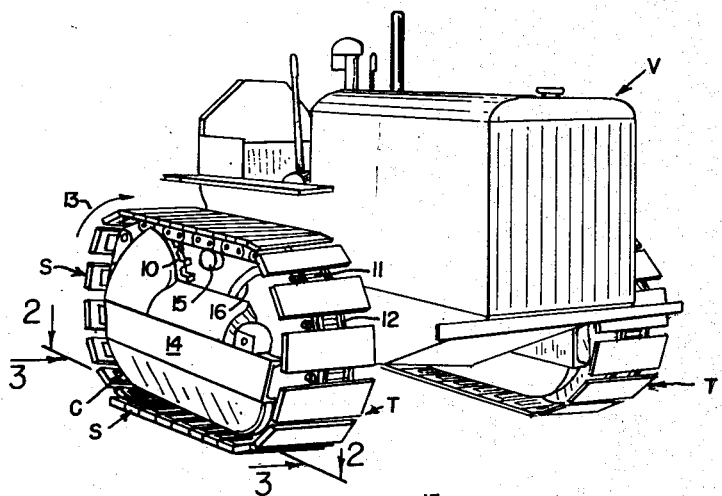
Fig. 1 is a perspective view of a tractor equipped with improved continuous tracks, constructed in accordance with this invention.

As illustrated in Fig. 1, a continuous track vehicle V, which is illustrated as a tractor but which may be a half-track or other type of continuous track vehicle, is provided with continuous tracks T at opposite sides, each track T being adapted to be driven from a conventional internal combustion engine or the like (not shown), mounted in the vehicle and adapted to rotate a sprocket 10, which causes each track T to move around a predetermined path, as in the form of an oval flattened at the top and bottom, as will be evident. The normal continuous track includes a plurality of cleats C which are pivoted together at their ends, as by pins 11 (shown also in Figs. 2 and 3) which also engage the sprocket 10, the cleats C also being connected together by links 12 which may be welded or otherwise secured to the cleats. As will be evident, as a track T is moved by the sprocket 10 in the direction of the arrow 13 of Fig. 1, the rear end of the track will be lifted around the sprocket 10, and the cleats at the front of the track will be laid down in succession on the ground. The vehicle is also provided with suitable means enclosed within a housing 14, such as including a series of rollers, one grooved roller 15 being shown in Fig. 3, adapted to rotate on the links 12, to support the vehicle for movement along the ground or lower flat portion of the track. At the front end, the track T may move around an idler sprocket 16, for which a large roller may be substituted, and additional rollers 15 (one shown) may be provided to support the track for movement along the upper flat portion of the path.

Generally, when the vehicle is to be turned, one of the tracks T is stopped or rotated at a slower rate, while the other track T is rotated at a faster rate or movement thereof is continued at the same rate. However, the radius of turn, particularly for higher speeds, during such turning movement of the vehicle V by means of movement at different speeds of the tracks T, is limited by the difference in radial distance between each cleat and a succeeding cleat, as the cleats are laid down, which in turn is limited by the difference in speed between the tracks. Also, since successive cleats are laid down only in a straight line, if the difference in speed between the tracks is increased, the tracks tend to slip sideways during turning, and the radius of turn tends to be automatically increased thereby.

Figure 2:
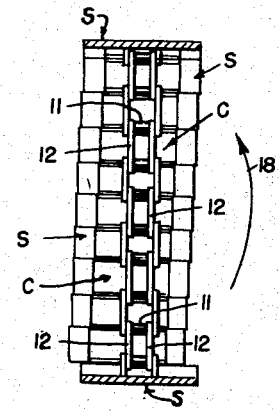
Fig. 2 is a horizontal section taken along line 2—2 of Fig. 1, illustrating the action of the continuous track parts when the vehicle is making a turn.

In accordance with the present invention, each of the cleats C is provided with a shoe S, each shoe being movable laterally with respect to the cleat and also provided with resilient means for resisting such lateral movement. In general, a sliding movement of the shoe S with respect to the associated cleat C is preferred, and the resilient means preferably comprises springs, such as springs 17 of Figs. 4 and 5. As shown in Figs. 1 and 2, the vehicle and tractor illustrated are being turned in the direction of the arrow 18 of Fig. 2. As will be observed, while the links 12 and cleats C are laid down in a straight line, the cleats C are moved outwardly, with respect to the radius of turn, in succession; that is, each cleat C slides further outwardly on the respective shoes, as the vehicle turns. This relative movement between each cleat C and shoe S is resisted by the springs 17 on the outside, but the outward thrust of the vehicle, produced by centrifugal force during turning, overcomes the resistance of these springs. Thus, as the vehicle V turns, the cleats further to the rear will have moved further outwardly with respect to the associated shoes, so that, while the shoes may be out of longitudinal alignment during turning, as shown in Fig. 2, the cleats C and links 12 may remain in alignment. Also, as soon as a shoe S leaves the ground, the resilient means, such as springs 17, will return the shoe to a central position, such as in the case of the shoe shown at the lower end of Fig. 2. This is also evident from Fig. 1, in which the shoe just leaving the ground at the rear is shown as having moved back to a position in alignment with the shoes disposed around the sprocket 10 and also those moving along the upper portion of the track path. From another standpoint, each shoe, as it touches the ground at the front, will be disposed centrally with respect to the corresponding cleat, but as the vehicle turns, the shoes will be laid down at points disposed outwardly of the previous shoe. This results in an effective lesser radius of turn, since the further outwardly the cleats move with respect to the shoes, the further inwardly the front of the track will be laid on the ground. Thus, the radius of turn will be lessened, and this will increase the speed at which the vehicle can make any specific turn.

Figure 3:
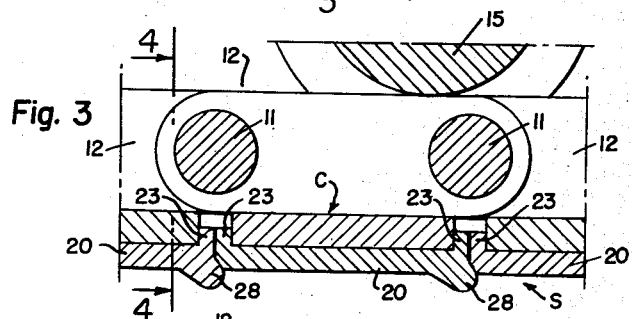
Fig. 3 is an enlarged fragmentary longitudinal section, taken along a limited portion of line 3—3 of Fig. 1.
Figure 4:
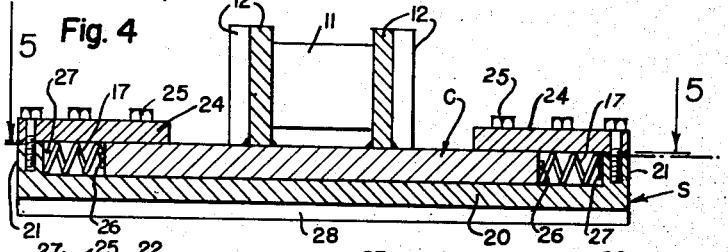
Fig. 4 is a transverse vertical section, taken along line 4—4 of Fig. 3.
Figure 5:
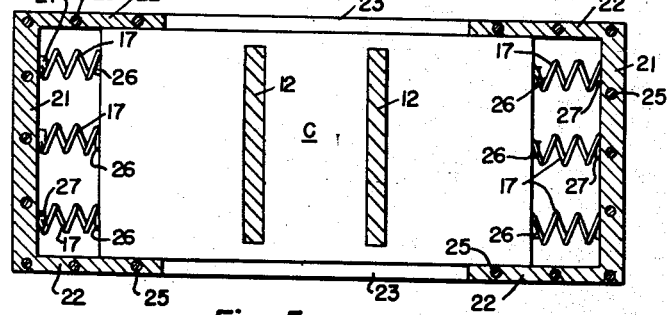
Fig. 5 is a horizontal section of a single track element, taken along line 5—5 of Fig. 4.

The shoes S may be constructed in the manner illustrated in Figs. 3–5, such as comprising comparatively flat, bottom plates 20 having upstanding flanges 21 at their sides, and also provided with higher end flanges 22 which extend longitudinally from the sides toward the center for a distance slightly greater than the distance between the side of a cleat C and a flange 21 when the opposite springs 17 are fully compressed. Center end flanges 23, preferably formed as continuations of the end flanges 22, may be slightly less in height than flanges 22, so as to prevent interference with the links 12 during pivoting action, but still sufficiently high to act as guides along the edges of the cleats C, as will be evident from Fig. 5. Each shoe S may be secured to a cleat C by caps 24, which extend over the top of the cleat at each side and which may be attached to flanges 21 and 22 in any suitable manner, as by cap screws 25, the caps 24 permitting a relatively easy assembly of a cleat C and shoe S in an obvious manner. The caps 24 prevent the shoe S from falling off the cleat C, and also enclose a space for the springs 17, the ends of which may be placed over studs or projections 26 and 27, as in Figs. 4 and 5, so as to maintain each spring with its coils in operating alignment. Studs 26 extend outwardly from the sides of the cleat C, while projections 27 extend inwardly from the side flanges 21 of the shoe S. As will be evident, the projections 26 and 27 may be formed integrally with either the cleats or the side flanges of the shoe, or may be pins threaded, riveted or otherwise secured in position, or may be replaced by wells for receiving the ends of the spring in a conventional manner. The lower front edge of each shoe S may also be provided with a downwardly and forwardly extending projection 28, preferably formed integrally with bottom plate 20, and adapted to provide additional traction in engaging the ground. The lower rear edge of each bottom plate 20 may also be cut away slightly, as in Fig. 3, to permit adjacent cleats to fit together during movement along the lower flat portion of the track path. The projections 28 also tend to prevent the entrance of earth material between flanges 23 of adjacent shoes, particularly when the latter tend to abut against each other, as shown in Fig. 3, it being evident that adjacent flanges 23 may be spaced apart, if desired.

In the additional embodiment of this invention illustrated in Figs. 6–8, the shoes and cleats are constructed so as to be formed conveniently of sheet metal or the like, the cleats C' of each track T being formed especially to accommodate the special shoes S'. Thus, each cleat C' may comprise a flat central section 30 having a transverse, doubled flange 31 formed at each end, as by crimping or rolling, and longitudinally therefrom a series of spaced transverse ears 32 or 32' bent around so as to provide a circular aperture for passage of a pin 33, by which one cleat may be pivoted to the next cleat. As will be evident, the ears 32 at one end of the shoe are complementarily placed with respect to the ears 32' at the opposite end of the shoe, so that the ears 32 of the next cleat will interfit with the ears 32' of the preceding cleat, and the side edges of the cleats will therefore be in alignment. It will be understood, of course, that the upper surface of the cleats C' are preferably provided with suitable means for engaging a drive gear, such as the central upstanding blocks 34 shown in Figs. 7 and 8 and which may be welded or otherwise suitably attached to the central section 30, and that the vehicle on which a track provided with cleats C' is utilized, will be provided with suitable rollers or the like, such as similar to roller 15 of Fig. 2, for engaging the upper surfaces of the cleats, as when such a cleat is disposed in a position along the lower or the upper horizontal portion of the track path. Such rollers may be disposed between the blocks 34, or the equivalent thereof, or may straddle the blocks, since in either case the blocks 34 or equivalent may cooperate with the rollers in maintaining the cleats in alignment along the path.

The transverse flanges 31, at each end of a cleat C', provide on the under side of the cleat a space for receiving an outwardly extending and laterally disposed lip 35 of a shoe S'. As will be evident from Figs. 6 and 7, the interfitting connection between lips 35 and flanges 31 permits the cleat C' to slide or move laterally relative to the shoe S'. The shoes S' may be formed from a single piece of metal to provide not only the lip 35 at the upper end of each end wall 36, but also the bottom 37 and side walls 38. An inwardly turned flange 39 at the top of each side wall 38 may be provided to add stability to the shoe. The bottom 37 of the shoe may be stamped or otherwise displaced to produce a series of indentations or inverted, open-bottomed boxes having slanting sides 40 and flat upper surfaces 41 on which the cleat C' may slide, the surfaces 41 being shown as disposed in the shape of an X but which may be disposed in any desired manner, the surfaces 41 preferably forming a continuous surface from one side of the shoe to the other. As will be evident from Fig. 6, the inverted box sides 40 merge at the front and rear, while adjacent the center, the bottom 37 may be additionally displaced to form a well 42 whose doubled ends 43 connect the adjacent box sides 40 and also form abutments for the ends of a pair of springs 44. The end spring abutments 43 may, of course, be separate pieces suitably attached to the ends of well 42, as by welding. The springs 44 are preferably relatively heavy springs, and are adapted to resist lateral movement of the cleat C' with respect to the shoe S', as through a central abutment 45 extending downwardly from the cleat C' and separating the two springs 44. The abutment 45 may be permanently attached to the cleat C', as by welding, but for convenience in assembly, is preferably removably attached, as by bolts or cap screws 46, or the like.

As will be evident, as long as the vehicle is traveling straight ahead, each shoe S' of Figs. 6–8 will tend to remain in central alignment with the cleat C'. However, if the vehicle starts to turn, the weight of the vehicle during turning movement will produce a side thrust, which will tend to cause a cleat C' to slide outwardly on a shoe S', this side thrust being resisted by one of the springs 44. As the vehicle turns, the side thrust will tend to move the cleat further outwardly on the shoe and further compress the spring 44 as the shoe progresses from front to rear on the ground. However, as soon as the shoe leaves the ground, the previously compressed spring 44 will move the shoe back to a central position with respect to the cleat.

As will be evident, the cleat C' may be formed from two or more pieces, one of which may be an outside piece and include the bottom 37, in this instance flat, at the edges of which are formed the end walls 38 and the side walls 36, each of the latter being provided with a lip 35. The other piece may be an inside piece providing the box sides 40 and end spring abutments 43, as well as the spring well 42 and slide surfaces 41, the lower edges of the box sides 40 merely resting on the bottom of the inside piece and the side flanges 39 of the latter being crimped over onto the surfaces 41 to hold the inside piece in place. For assembly of a cleat C' and shoe S' of Figs. 6–8, the springs 44, with the center abutment therebetween, may be placed in well 42, and the lips 35 then engaged with the cleat flange 31 and the shoe slid into a central position so that the tapped cap screw holes in center spring abutment 45 will line up with the corresponding holes in the cleat center section 30. Then, the cap screws 46 may be inserted and tightened. As will be evident from Fig. 6, the open upper side of the spring well 42 is preferably covered by the cleat C' at all times during use, so that if the center spring abutment 45 is permanently attached to the cleat C', it may be desirable to bend the flange 31 of the cleat C' only slightly before assembly, so that the cleat may be placed over the shoe, or vice versa, to permit the center spring abutment 45 to be inserted between the springs 44, after which the flanges 31 may be bent into final position.

In both the embodiment of Figs. 3–5 and the embodiment of Figs. 6–8, the shoe S and shoe S' is wider than the corresponding cleat C or C'. However, the cleat may be wider than the shoe, such as in the embodiment illustrated in Figs. 9 and 10, in which the cleat C'' is wider than the shoe S'', but similarly adapted to move thereon laterally.

Each cleat C'' may include a longitudinally extending plate 50 having ears 51 and 51' formed at its ends, so as to receive a pin to pivot one cleat to the adjacent cleats, in a manner similar to the ears 31 and 31' and the pins 32 of Figs. 6 and 7. The cleat C'' may also be provided with suitable means, such as similar to the blocks 34 of Figs. 7 and 8 or the equivalent thereof, for engaging a drive sprocket or the like. Each shoe S'' may be an open bowl type having a flat bottom 52, side flanges 53 and end flanges 54, and also provided with a set of centrally disposed, longitudinally spaced abutment 55 for springs 56, such as three pairs or sets. Abutment 55 may be welded to the inside of the shoe, formed integrally therewith, or removably attached thereto, the latter of which may be found advantageous for assembly purposes. The cleat C' may also include a pair of complementary guiding and supporting angles 58 which are provided at their inside edges with downwardly extending flanges 59, providing abutments for the springs 57 as in Fig. 10, and upwardly extending flanges 60 at their outer edges which are adapted to engage a guide wheel or the like, for maintaining the cleats in alignment. The center plate 50 may be welded or otherwise suitably secured to the angles 58, so as to move with the latter. As will be evident, as the cleat C' moves laterally in either direction with respect to the shoe S', one set of the springs 56 will be compressed, and when the compressive force is released the shoe will return to a central position with respect to the cleat. The cleat and shoe may be held together by a series of pins 61, one of which is disposed centrally of each set of the springs 56 and extends through a hole provided therefor in spring abutment 55 and the flanges 59. In addition, for more adequate support of the cleat on the shoe, a roller 62 may be disposed in the space within the shoe, beneath the angles 58. The rollers 62 may be placed within the space in a relatively free condition, i. e. with freedom of back and forth movement in accordance with relative movement of the cleat and shoe; or the rollers 62 may be provided with restraining blocks or any other suitable means for maintaining the axes thereof substantially perpendicular to the direction of relative movement between the shoe and cleat. To assemble the track of Figs. 9 and 10, in the event that the abutments 55 are removably attached to the bottom 52 of the shoe S'', the pin 61, springs 56 and abutment 55 may be assembled with the cleat C'', and the cleat placed in the shoe, with the roller 62 in position, and the abutment 55 then attached to the shoe. In the event that the abutment 55 is permanently attached to the shoe, a suitable access hole or series of holes, adapted to be closed by removable plugs, if desired, may be provided in the plate 50, so that the pin 61 may be moved into position after the cleat is inserted in the shoe, with the springs in position. If desired, the shoe may be made in two halves, the shoe being split at the center along a longitudinal line extending centrally of the abutments 55, the latter thus being made in two parts. With such construction of the shoe, assembly may be somewhat easier than with the shoe in one piece and the abutments 55 permanently attached thereto, although some provision must be made for attaching the two halves of the shoe together, as by laterally extending ears on the outside and bolts or the like attaching the same together.

From the foregoing, it will be evident that the continuous track of this invention fulfills to a marked degree the requirements and objects hereinbefore set forth. As will be evident, the relative lateral movement between the cleats and the shoes therefore permits the vehicle to make sharper turns and also to turn at higher speeds, since the respective cleats may move outwardly with respect to the shoes as the vehicle turns. Also, the addition of shoes upon which the cleats may move laterally upon the imposition of a side thrust, does not interfere with the normal forward movement of the vehicle, since the resilient means or springs maintain the shoes in a central location with respect to the cleats. Also, if the vehicle is operating on a side slope, the cleats will merely move on the shoes until the springs on one side are fully compressed. As will be evident, the shoes and cleats of each of the improvements shown and described may be incorporated without difficulty in continuous track vehicles of present construction, since the tracks are adapted to move around the present types of rollers, drive sprockets, idler sprockets and the like. In each of the embodiments, the springs are completely enclosed, so that entrance of foreign material which might interfere with their operation is prevented. Also, the parts necessary to provide workable shoes in association with the cleats are sufficiently simple, and also may be made of sufficiently heavy material, that reliability in operation is assured. As described herein, the manufacturing operations are not complicated, nor is the installation.

Although several different embodiments have been illustrated and described, it will be understood that other embodiments may exist, and that various changes may be made therein, all without departing from the spirit and scope of this invention.

What is claimed is:

1. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being movable laterally on the associated shoe; and resilient means disposed centrally of said cleat and resisting such lateral movement.

2. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being slidable laterally on the associated shoe and each said shoe overlies a portion of said cleat to guide said shoe and cleat during relative movement therebetween; and resilient means resisting such lateral movement.

3. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being wider than the associated cleat and the associated shoe; and springs disposed between the sides of said cleat and the associated shoe for resisting such lateral movement.

4. In a continuous track for tractor vehicles and the like, as defined in claim 1, wherein each cleat is wider than the associated shoe.

5. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being movable laterally on the associated shoe and each said shoe having a bottom, side flanges spaced from the sides of the associated cleat, end flanges cooperating with the ends of said cleat for guiding the same during relative movement, springs disposed between said cleat sides and said side flanges, and top portions overlying the side portions of said cleat.

6. In a continuous track for tractor vehicles and the like, as defined in claim 5, wherein said top portions comprise caps removably attached to said side and end flanges.

7. In a continuous track for tractor vehicles and the like, said track including a series of cleats pivoted together in succession adjacent their ends and provided with means disposed centrally thereof for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being movable laterally on the associated shoe, and each said cleat including a laterally disposed flat plate having free ends, and each said shoe comprising a flat bottom plate having end flanges engageable with the ends of said cleat and side flanges spaced from the sides of said cleat, said shoe side flanges and end flanges at each side extending to a height corresponding to the top of said cleat; a series of compression springs between each side of said cleat and each shoe side flange, said cleat and shoe side flanges having projections over which the ends of said springs fit; and a cap removably attached to said shoe side and end flanges and enclosing the space for said springs, each cap also overlying a portion of the top of said cleat at each side thereof.

8. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being movable laterally on the associated shoe and the ends thereof interfitting for guiding the same during relative movement; and resilient means resisting such lateral movement.

9. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being movable laterally on the associated shoe and said shoe being provided with a bottom and sections raised from said bottom and forming surfaces on which said cleat may slide, said surfaces being disposed in substantially an X form; and resilient means resisting such lateral movement.

10. In a continuous track for tractor vehicles and the like, as defined in claim 9, wherein said shoe is provided with a spring well at the center of the X formed by said slide surfaces; and said resilient means comprises springs disposed in said well.

11. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being movable laterally on the associated shoe and the bottom of said cleat being spaced from the bottom of said shoe, one of said cleat and shoe being provided with a central flange and the other with an abutment at each side thereof; and a compression spring disposed between said flange and each said abutment.

12. In a continuous track for tractor vehicles and the like, as defined in claim 11, wherein said flange depends from said cleat.

13. In a continuous track for tractor vehicles and the like, as defined in claim 11, wherein said flange extends upwardly from said shoe.

14. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises cleats formed of metal plates and bent at each end to form a doubled flange forming a guide space below said plate and a series of generally circular, pin receiving ears; a shoe formed of a metal plate having indentations in the bottom thereof providing a series of flat surfaces spaced above the bottom and connected thereto by sloping sides, said flat surfaces extending diagonally across said shoe in an X-form and said indentations being discontinued at the center to form a spring receiving well disposed transversely of said shoe with the sides of indentations at each side being connected to form spring abutments, said shoe plate also being formed to provide a lip at each end for reception in said cleat guide space and an upstanding flange at each side; a central spring abutment attached to said cleat and extending downwardly into said shoe spring well; and a pair of coil springs in said well disposed on opposite sides of said cleat abutment.

15. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises a shoe for each cleat disposed generally on the opposite side thereof from said sprocket engaging means, each said cleat being movable laterally on the associated shoe, said shoe and cleat forming spaces therebetween for reception of compression springs disposed centrally thereof for resisting such lateral movement, and a roller disposed laterally of said springs to each side thereof.

16. In a continuous track for tractor vehicles and the like, as defined in claim 15, wherein one of said cleat and shoe is provided with spaced flanges forming abutments for said springs and separating the spring space from the space in which said rollers are disposed.

17. In a continuous track for tractor vehicles and the like, said track including a series of cleats pivoted together in succession adjacent their ends and provided with means for engaging a drive sprocket or the like to move said track around a continuous predetermined path having upper and lower portions disposed longitudinally of said vehicle and along the lower portion of which said track engages the ground, said vehicle having means for support and movement on the lower portion of said track whereby said vehicle moves along the ground as said track moves around said path, the improvement which comprises cleats formed of sheet metal and including a flat plate formed with ears at each end for engaging a pivot pin with the ears at one end of each cleat interspaced with the ears of the cleat ahead and behind, and a flanged plate attached at each side to said flat plate on the underside thereof, each said flanged plate being provided with an upstanding flange on the outside and a downwardly extending flange on the inside, said downwardly extending flanges of said flanged plates being spaced apart to form spring abutments; a shoe for each plate having an upstanding flange at the front and rear and at each side, said cleat side flanges being spaced apart a greater distance than said downwardly extending flanges of said cleat flanged plates, and said shoe having a central upstanding flange; a series of compression springs disposed in aligned pairs and bearing against said shoe central flange from opposite sides thereof and bearing at their outer ends against said downwardly extending flanges of said cleat plate; a pin extending through each pair of springs and also through said shoe central flange and downwardly extending flanges; and a roller at each side in the space between said shoe side flanges and said cleat plate downwardly extending flanges.

References Cited in the file of this patent

UNITED STATES PATENTS

| | | |
|---|---|---|
| 1,202,814 | Diplock | Oct. 31, 1916 |

FOREIGN PATENTS

| | | |
|---|---|---|
| 201,579 | Great Britain | July 10, 1920 |